United States Patent
Fukuda et al.

(10) Patent No.: US 11,208,081 B2
(45) Date of Patent: Dec. 28, 2021

(54) HYDROGEN STATION

(71) Applicant: Kobe Steel, Ltd., Hyogo (JP)

(72) Inventors: Takayuki Fukuda, Takasago (JP); Kenji Nagura, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 211 days.

(21) Appl. No.: 16/024,969

(22) Filed: Jul. 2, 2018

(65) Prior Publication Data

US 2019/0031156 A1 Jan. 31, 2019

(30) Foreign Application Priority Data

Jul. 28, 2017 (JP) .............................. JP2017-146754

(51) Int. Cl.
*B60S 5/02* (2006.01)
*F17C 5/00* (2006.01)
(Continued)

(52) U.S. Cl.
CPC .............. *B60S 5/02* (2013.01); *B60K 15/067* (2013.01); *F04B 41/00* (2013.01); *F04B 49/06* (2013.01);
(Continued)

(58) Field of Classification Search
CPC ........ F25D 17/02; F17C 2260/035–038; F17C 13/12; F17C 2260/042; F17C 2227/0171;
(Continued)

(56) References Cited

U.S. PATENT DOCUMENTS 3,543,530 A * 12/1970 Brennen .................. F17C 3/005
62/53.1
4,800,729 A * 1/1989 Hara ...................... F25B 25/005
62/185
(Continued)

FOREIGN PATENT DOCUMENTS

CH 676951 A5 * 3/1991 .............. F17C 5/007
JP 2011-132876 A 7/2011
(Continued)

OTHER PUBLICATIONS

The extended European search report issued by the European Patent Office dated Sep. 28, 2018, which corresponds to EP18181349.4-1004 and is related to U.S. Appl. No. 16/024,969.

*Primary Examiner* — Joel M Attey
*Assistant Examiner* — For K Ling
(74) *Attorney, Agent, or Firm* — Studebaker & Brackett PC (57) ABSTRACT

The present application discloses a hydrogen station for supplying hydrogen to a tank of a tank-equipped device. The hydrogen station includes: an integrated controller for integrally controlling devices provided in the hydrogen station; a sensing portion for sensing leaked hydrogen which has leaked inside the integrated controller; a ventilation device performing a high ventilation measure of performing ventilation for air inside the integrated controller or an explosion prevention device performing an internal pressure-based explosion protection measure of creating a pressure-increased state inside the integrated controller; and a compressor unit including a compressor, which is used as one of the devices, and a housing, in which the compressor is stored. The integrated controller is mounted on the housing, and is electrically connected to the compressor via a (Continued)

through-hole formed in the housing to control the compressor.

6 Claims, 4 Drawing Sheets

(51) Int. Cl.
  *F04B 41/00* (2006.01)
  *F04B 49/06* (2006.01)
  *B60K 15/067* (2006.01)
  *F17C 5/06* (2006.01)
  *F17C 7/00* (2006.01)
  *F17C 13/00* (2006.01)
  *F04B 15/08* (2006.01)
  *B60K 15/03* (2006.01)

(52) U.S. Cl.
  CPC ............... *F17C 5/007* (2013.01); *F17C 5/06* (2013.01); *F17C 7/00* (2013.01); *F17C 13/002* (2013.01); *B60K 2015/03315* (2013.01); *F04B 2015/0822* (2013.01); *F17C 2205/0111* (2013.01); *F17C 2205/0176* (2013.01); *F17C 2205/0326* (2013.01); *F17C 2221/012* (2013.01); *F17C 2223/0123* (2013.01); *F17C 2225/0123* (2013.01); *F17C 2227/0157* (2013.01); *F17C 2227/0164* (2013.01); *F17C 2227/0341* (2013.01); *F17C 2227/0348* (2013.01); *F17C 2250/032* (2013.01); *F17C 2250/034* (2013.01); *F17C 2250/043* (2013.01); *F17C 2250/0439* (2013.01); *F17C 2250/0443* (2013.01); *F17C 2250/0636* (2013.01); *F17C 2260/038* (2013.01); *F17C 2260/042* (2013.01); *F17C 2265/061* (2013.01); *F17C 2265/065* (2013.01); *F17C 2270/0168* (2013.01); *F17C 2270/0184* (2013.01)

(58) Field of Classification Search
  CPC .. F17C 2227/0157; B67D 7/3227; B60S 5/02; F04B 49/06
  See application file for complete search history.

(56) References Cited

U.S. PATENT DOCUMENTS

| | | | | |
|---|---|---|---|---|
| 6,343,627 | B1* | 2/2002 | Hasaka | F17C 7/00 141/18 |
| 6,672,340 | B2* | 1/2004 | Mutter | F17C 5/06 141/21 |
| 8,757,223 | B2* | 6/2014 | Uemura | F17C 5/06 141/197 |
| 2003/0164202 | A1* | 9/2003 | Graham | F17C 5/007 141/98 |
| 2004/0178062 | A1* | 9/2004 | Howard | F17C 13/02 204/270 |
| 2006/0016512 | A1 | 1/2006 | Takano et al. | |
| 2006/0162811 | A1* | 7/2006 | Roach | F17C 13/126 141/325 |
| 2008/0289720 | A1 | 11/2008 | Takano et al. | |
| 2012/0000574 | A1* | 1/2012 | Nishiumi | F17C 13/026 141/94 |
| 2013/0337737 | A1* | 12/2013 | DeVarney | F17C 13/084 454/347 |
| 2015/0240996 | A1* | 8/2015 | Kapoor | F17C 13/002 137/14 |
| 2015/0377416 | A1* | 12/2015 | Miyoshi | G05D 7/0635 141/95 |
| 2016/0348840 | A1* | 12/2016 | Nagura | F17C 5/06 |
| 2017/0114958 | A1* | 4/2017 | Otaki | F17C 13/025 |

FOREIGN PATENT DOCUMENTS

| | | |
|---|---|---|
| JP | 2015-232384 A | 12/2015 |
| KR | 1020050058416 A | 6/2005 |

* cited by examiner

HYDROGEN STATION

TECHNICAL FIELD

The present invention relates to a hydrogen station for supplying hydrogen to a tank of a tank-equipped device.

BACKGROUND ART

A hydrogen station includes various devices such as a compressor unit, a refrigerator, a pressure accumulator unit and a dispenser (c.f. JP 2015-232384 A). The compressor unit compresses hydrogen through multiple stages. The compressed hydrogen is temporarily stored inside the pressure accumulator unit. The pressure accumulator unit is connected to the dispenser. The refrigerator cools brine for cooling the hydrogen which flows from the pressure accumulator unit to the dispenser. The dispenser, which receives the cooled hydrogen, includes an adaptor which fits with a supply port of a tank of a tank-equipped device. The hydrogen compressed by the compressor unit is supplied from the pressure accumulator unit to the tank of the tank-equipped device through the adaptor of the dispenser.

JP 2015-232384 A discloses an integrated controller for integrally controlling the aforementioned various devices which constitute the hydrogen station. The integrated controller is situated at a non-explosion-proof area which is distant from these devices. Therefore, the hydrogen station disclosed in JP 2015-232384 A requires a large installation area.

Since the compressor unit compresses hydrogen, the compressor unit requires a safety measure for preventing explosion of hydrogen. The safety measure also has to be implemented in a wiring area for wiring the compressor unit to the integrated controller. Since the integrated controller is placed at the non-explosion-proof area, which is distant from the compressor unit, the hydrogen station of JP 2015-232384 A also uses a large wiring area in order to implement a safety measure. In addition, since the hydrogen station of JP 2015-232384 A also has a compressor controller next to the compressor, separately from the integrated controller, there is a high cost required for installation of the hydrogen station.

SUMMARY OF INVENTION

The present invention aims to provide a hydrogen station which may be constructed in a small installation space.

A hydrogen station according to one aspect of the present invention supplies hydrogen to a tank of a tank-equipped device. The hydrogen station includes: an integrated controller configured to integrally control devices provided in the hydrogen station; a sensing portion configured to sense leaked hydrogen, which has leaked inside the integrated controller; a ventilation device configured to perform a high ventilation measure of performing ventilation for air inside the integrated controller or an explosion prevention device configured to perform an internal pressure-based explosion protection measure of creating a pressure-increased state inside the integrated controller; and a compressor unit including a compressor which is used as one of the devices; and a housing in which the compressor is stored. The integrated controller is mounted on the housing, and is electrically connected to the compressor via a through-hole formed in the housing to control the compressor.

The aforementioned hydrogen station may be constructed even under a narrow installation space.

The objective, features and advantages of the aforementioned hydrogen station will be more clarified by the detailed description provided in the following and the attached drawings.

DESCRIPTION OF EMBODIMENTS

First Embodiment

A compressor unit for compressing hydrogen is a relatively large device in a hydrogen station. If an integrated controller for integrally controlling various devices used in the hydrogen station is mounted onto the compressor unit, the outer surface of the compressor unit may be effectively used for mounting the integrated controller. In addition, the integrated controller is placed in close contact with the compressor unit, so that no unnecessary space is formed between the integrated controller and the compressor unit. Accordingly, it is possible to construct the hydrogen station in a small installation area. An exemplary hydrogen station having an integrated controller which is mounted on a compressor unit is described in the first embodiment.

Figure 1:
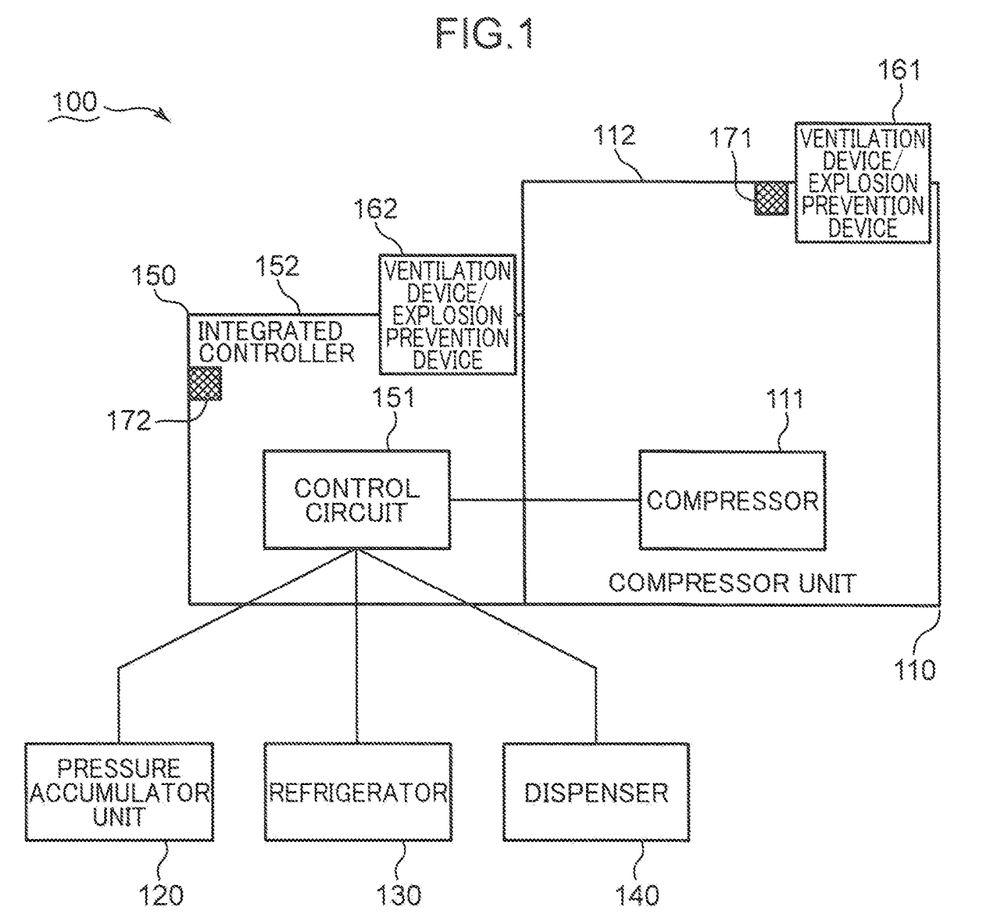
FIG. 1 is a conceptual view of a hydrogen station according to the first embodiment.

FIG. 1 is a conceptual view of a hydrogen station 100 according to the first embodiment. The hydrogen station 100 is described with reference to FIG. 1.

The hydrogen station 100 is used to supply hydrogen to a tank of a fuel cell vehicle (not shown; one example of a tank-equipped device). The hydrogen station 100 includes a compressor unit 110, a pressure accumulator unit 120, a refrigerator 130, a dispenser 140, an integrated controller 150, two ventilation devices/explosion prevention devices 161, 162 and two sensing portions 171, 172. The compressor unit 110, the pressure accumulator unit 120, the refrigerator 130 and the dispenser 140 set a pressure and a temperature of the hydrogen to appropriate values, the hydrogen being supplied to the fuel cell vehicle. In addition to these devices, the hydrogen station 100 may have other devices necessary for adjusting the pressure and the temperature of the hydrogen to be supplied to the fuel cell vehicle.

The compressor unit 110 of the hydrogen station 100 compresses hydrogen through multiple stages to increase the pressure of the hydrogen to an appropriate value. The compressed hydrogen is temporarily stored inside the pressure accumulator unit 120. The pressure accumulator unit 120 is connected to the dispenser 140. The refrigerator 130 cools the brine for cooling the hydrogen supplied from the pressure accumulator unit 120 to the dispenser 140. The dispenser 140, which receives the hydrogen from the pressure accumulator unit 120, has an adaptor (not shown) which fits a supply port of the fuel cell vehicle. The hydrogen compressed by the compressor unit 110 is supplied from the pressure accumulator unit 120 to the fuel cell vehicle through the adaptor of the dispenser 140.

Each of the compressor unit 110, the pressure accumulator unit 120, the refrigerator 130 and the dispenser 140 may include sensors (not shown) for sensing the pressure and a flow amount of hydrogen; an electromagnetic valve (not shown) for adjusting the flow of hydrogen; and other electric actuators (not shown) necessary for operations of these devices. The integrated controller 150 is electrically connected to the sensors, the electromagnetic valves and other electric actuators to integrally control the compressor unit 110, the pressure accumulator unit 120, the refrigerator 130 and the dispenser 140.

The compressor unit 110 includes a compressor 111 and a housing 112. The compressor 111 compresses hydrogen. The housing 112 encloses and protects the compressor 111. Since the compressor 111 fixed inside the housing 112 has a relatively large size in the hydrogen station 100, the housing 112 also has a large volume. Accordingly, the housing 112 has an outer surface which is large enough to mount the integrated controller 150.

The integrated controller 150 includes a control circuit 151 and a control box 152. The control box 152 encloses and protects the control circuit 151 fixed inside the control box 152.

With regards to the present embodiment, the housing 112 of the compressor unit 110 and the control box 152 of the integrated controller 150 both have a substantially cuboid shape. The control box 152 is mounted on the outer peripheral surface of the housing 112. Appropriate fastening tools such as screws and rivets may be used for mounting the control box 152 on the outer peripheral surface of the housing 112. Alternatively, the control box 152 may be welded onto the outer peripheral surface of the housing 112.

Since the control box 152 of the integrated controller 150 is directly mounted on the housing 112 of the compressor unit 110, no unnecessary space is formed between the control box 152 and the housing 112. Accordingly, the hydrogen station 100 may be constructed in a small installation area.

The control box 152 and the housing 112 in the hydrogen station 100 both have through-holes (not shown) formed in their peripheral walls. Through the through-holes formed in the control box 152 and the housing 112, signal and power lines are connected to the control circuit 151 and the compressor 111. The control circuit 151 generates a control signal for controlling the compressor 111. The control signal is transmitted to the compressor 111 over the signal line which is connected to the control circuit 151 and the compressor 111 by using the through-holes in the peripheral walls of the control box 152 and the housing 112. The compressor 111 executes operations in response to the control signal. The compressor 111 may have a sensor (not shown) for detecting a state of the compressor 111. A state signal indicating the state of the compressor 111 may be transmitted to the control circuit 151 over the signal line which extends between the control circuit 151 and the compressor 111. The state signal is used for feedback control between the control circuit 151 and the compressor 111.

Through the control box 152, the control circuit 151 is electrically connected to the sensors, the electromagnetic valves and other electric actuators of the pressure accumulator unit 120, the refrigerator 130 and the dispenser 140. Through-holes may be formed on the control box 152 so that signal and power lines extend through the through-holes to electrically connect the control circuit 151 to each of the pressure accumulator unit 120, the refrigerator 130 and the dispenser 140. Control signals for controlling these devices and state signals indicating states of these devices are exchanged between the control circuit 151 and these devices, similarly to the communication between the compressor 111 and the control circuit 151.

Since the compressor unit 110, to which the control box 152 is attached with the control circuit 151 fixed in the control box 152, compresses hydrogen, it should be avoided that the inside of the housing 112 of the compressor unit 110 is filled with hydrogen. Accordingly, the sensing portion 171 configured to detect leaked hydrogen which has leaked inside the housing 112, is fixed inside the housing 112. Since hydrogen is lighter than air, the sensing portion 171 is preferably fixed to an upper part (a space higher than the middle in the height dimension of the housing 112) of the internal space formed by the housing 112.

The leaked hydrogen which has leaked inside the housing 112 may flow from the internal space formed by the housing 112 into the control box 152 adjacent to the housing 112. Accordingly, the sensing portion 172 configured to detect leaked hydrogen inside the control box 152 is fixed inside the control box 152. Like the sensing portion 171, the sensing portion 172 is preferably fixed to an upper part (a space higher than the middle in the height dimension of the control box 152) of the internal space formed by the control box 152. Various hydrogen gas sensors may be used as the sensing portions 171, 172.

When the sensing portions 171, 172 detect hydrogen at a predetermined concentration or higher, the sensing portions 171, 172 generate notification signals providing notification of hydrogen leakage. The notification signals may be output from the sensing portions 171, 172 to the control circuit 151. In this case, the control circuit 151 may stop the compressor 111. Additionally or alternatively, the notification signals may be output from the sensing portions 171, 172 to another safety facility. In this case, the safety facility takes a predetermined safety measure for preventing the explosion of hydrogen in order to prevent explosion of the leaked gas.

The ventilation device/explosion prevention device 161 is mounted on the housing 112 of the compressor unit 110. The ventilation device 161 may be a ventilation fan which takes a high ventilation measure to suck air out from the inside of the housing 112. The explosion prevention device 161 may be an air blower configured to send protection gas (clean compressed air or inert gas) into the housing 112 to create a pressure-increased environment (i.e. takes an internal pressure-based explosion prevention measure).

The ventilation device/explosion prevention device 162 is mounted on the control box 152 of the integrated controller 150. The ventilation device 162 may be a ventilation fan which takes the high ventilation measure to suck air out from the inside of the control box 152. The explosion prevention device 162 may be an air blower configured to send the protection gas into the control box 152 to create a pressure-increased environment (i.e. takes the internal pressure-based explosion prevention measure).

Since the ventilation devices/explosion prevention devices 161, 162 are respectively mounted on the housing 112 of the compressor unit 110 and the control box 152 of the integrated controller 150 to take the high ventilation measure or the internal pressure-based explosion prevention measure, the hydrogen station 100 may safely operate. The ventilation devices/explosion prevention devices 161, 162 may operate under power supply from the control circuit 151 and/or under control by the control circuit 151, or may operate independently from the control circuit 151.

As described above, the control circuit 151 is electrically connected to the compressor 111 of the compressor unit 110, the pressure accumulator unit 120, the refrigerator 130 and the dispenser 140. The integrated controller 150 may be connected to these devices via a fieldbus (i.e. may be bus-connected with these devices). Consequently, there may be a small number of wires extending out from the integrated controller 150. The fieldbus connecting the integrated controller 150 to these devices may form a field network (e.g. CC-Link or MODBUS). Since additional facilities are easily connected to the field network, functions of the hydrogen station 100 are easily expanded.

(Hydrogen Station with Communication Function)

The control circuit 151 may communicate with a communication terminal carried by an operator. In this case, the operator may monitor a state of the hydrogen station 100 at a distant location from the hydrogen station 100. In addition, the operator may provide the hydrogen station 100 with various instructions at a distant location from the hydrogen station 100.

Figure 2:
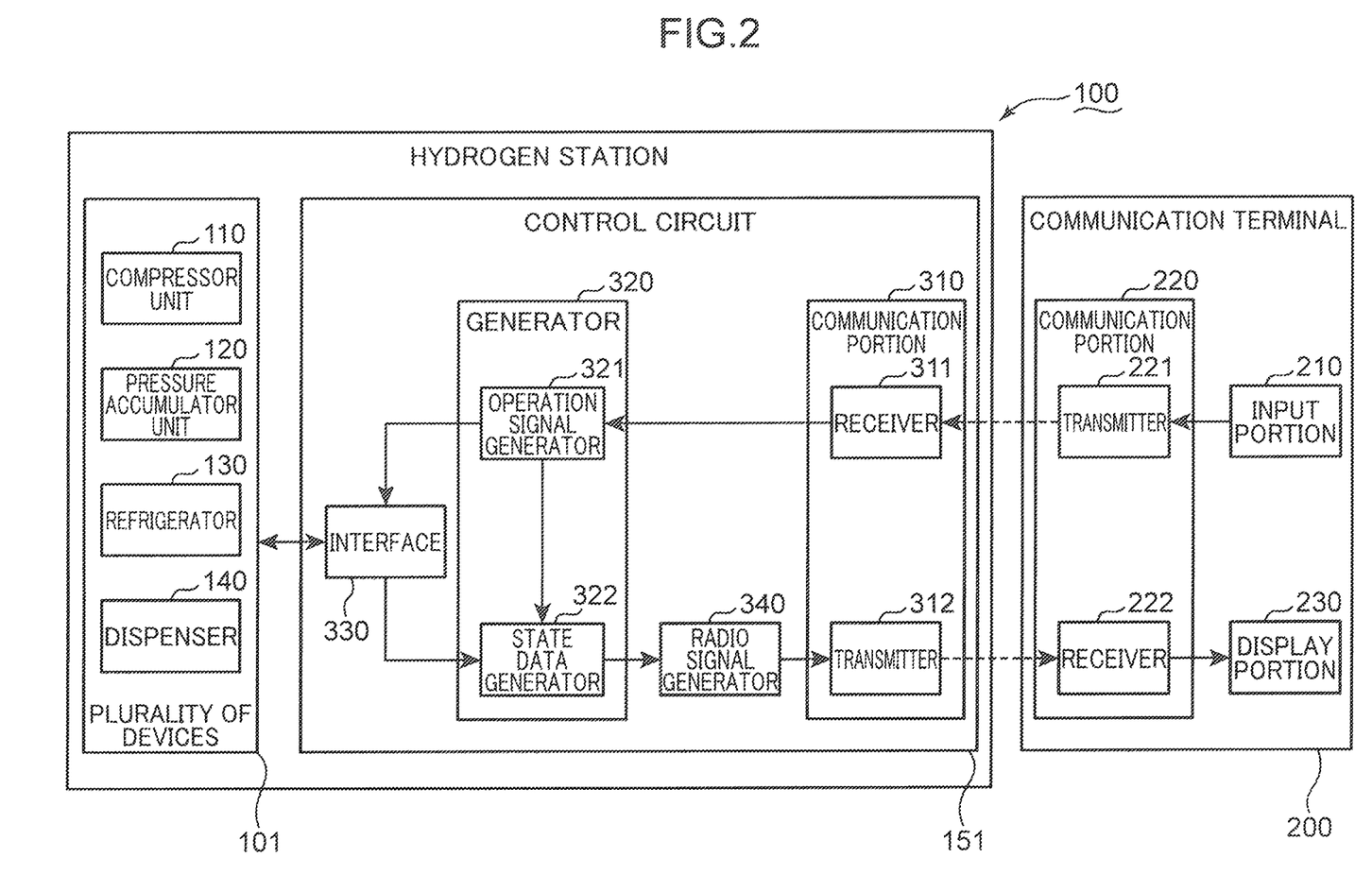
FIG. 2 is a schematic block diagram showing an exemplary functional configuration of the hydrogen station shown in FIG. 1.

FIG. 2 is a schematic block diagram indicating an exemplary functional configuration of the hydrogen station 100. The hydrogen station 100 is further described with reference to FIG. 2.

In addition to the hydrogen station 100, FIG. 2 shows a communication terminal 200 carried by an operator. The communication terminal 200 may be a tablet or a smartphone.

The communication terminal 200 includes an input portion 210, a communication portion 220 and a display portion 230. The input portion 210 is used by the operator to input a desired request. For example, the operator may request the hydrogen station 100 via the input portion 210 that the hydrogen station 100 provides state information indicating the state of the hydrogen station 100 (e.g. pressure and temperature of hydrogen and an amount of pressurized and accumulated hydrogen). Alternatively, the operator may request the hydrogen station 100 via the input portion 210 that the hydrogen station 100 carries out an operation desired by the operator. The operator's request is transmitted from the input portion 210 to the communication portion 220.

The communication portion 220 includes a transmitter 221 and a receiver 222. The transmitter 221 receives the operator's request from the input portion 210. The transmitter 221 outputs the operator's request to the hydrogen station 100 in the form of a radio signal. When the operator requests providing the state information, the hydrogen station 100 generates a radio signal indicating the state information requested by the operator. The radio signal indicating the state information is transmitted from the hydrogen station 100 to the receiver 222. When the operator requests the hydrogen station 100 to carry out a specific operation, the hydrogen station 100 executes the operation requested by the operator.

The state information which the receiver 222 receives from the hydrogen station 100 in the form of a radio signal is output from the receiver 222 to the display portion 230. The display portion 230 displays the state information in the form of character information (e.g. numerical values) and/or image information (e.g. a graph and/or a table).

The operator watches the state information displayed on the display portion 230, so that the operator may monitor the state of the hydrogen station 100. Since the operator can carry the communication terminal 200, the operator may monitor the state of the hydrogen station 100 and control the hydrogen station 100 without approaching the hydrogen station 100.

As the hydrogen station 100, FIG. 2 shows devices 101 and the control circuit 151. The devices 101 in FIG. 2 indicate the compressor unit 110, the pressure accumulator unit 120, the refrigerator 130 and the dispenser 140.

The control circuit 151 in FIG. 2 includes a communication portion 310, a generator 320, an interface 330 and a radio signal generator 340. The communication portion 310 includes a receiver 311 and a transmitter 312. The receiver 311 receives a radio signal indicating an operator's request from the transmitter 221 of the communication terminal 200 whereas the transmitter 312 transmits a radio signal indicating the state information of the hydrogen station 100 to the receiver 222 of the communication terminal 200.

The generator 320 of the control circuit 151 includes an operation signal generator 321 and a state data generator 322. The operation signal generator 321 receives the operator's request via the receiver 311 of the communication portion 310. The operation signal generator 321 generates an operation signal requesting an operation in response to the operator's request. When the operator requests state information indicating the state of the hydrogen station 100, the operation signal generator 321 generates an operation signal which requests generating the state information. The operation signal which requests generating the state information is output from the operation signal generator 321 to the state data generator 322. When the operator requests a specific operation by the devices 101, the operation signal generator 321 generates an operation signal which requests the operation desired by the operator. The operation signal requesting the operation desired by the operator is output from the operation signal generator 321 to the interface 330.

The interface 330 is bus-connected to the compressor unit 110, the pressure accumulator unit 120, the refrigerator 130 and the dispenser 140. The operation signal requesting the operation desired by the operator is output via the interface 330 to a target device of the request among the devices 101. The device receiving the operation signal which requests the operation desired by the operator executes the operation desired by the operator. Accordingly, the operator may remotely control the hydrogen station 100 at a distant location from the hydrogen station 100.

The interface 330 may receive a state signal via the fieldbus from the compressor unit 110, the pressure accumulator unit 120, the refrigerator 130 and the dispenser 140, the state signals indicating states of the respective devices. The state signals are transmitted from the interface 330 to the state data generator 322. When the state data generator 322 receives an operation signal, which requests generating state information, from the operation signal generator 321, the state data generator 322 generates state data including the information requested by the operator. The state data is output from the state data generator 322 to the radio signal generator 340. The radio signal generator 340 generates a radio signal indicating the state data. The radio signal is transferred from the radio signal generator 340 to the transmitter 312, and then transmitted from the transmitter 312 to the receiver 222 of the communication terminal 200.

The state data is then transferred from the receiver 222 to the display portion 230. The display portion 230 displays the state data in the form of character information and/or image information. The operator watching the display portion 230 may monitor the state of the hydrogen station 100.

Second Embodiment

The hydrogen station of the first embodiment includes a plurality of sensing portions and a plurality of ventilation devices/explosion prevention devices. The sensing portions and the ventilation devices/explosion prevention devices are situated in both of the integrated controller and the compressor unit. However, a sensing portion and a ventilation device which are situated in the compressor unit may be shared with the integrated controller. In this case, the hydrogen station may have a smaller number of components. An exemplary hydrogen station having a sensing portion and a ventilation device which are shared by an integrated controller and a compressor unit is described in the second embodiment.

Figure 3:
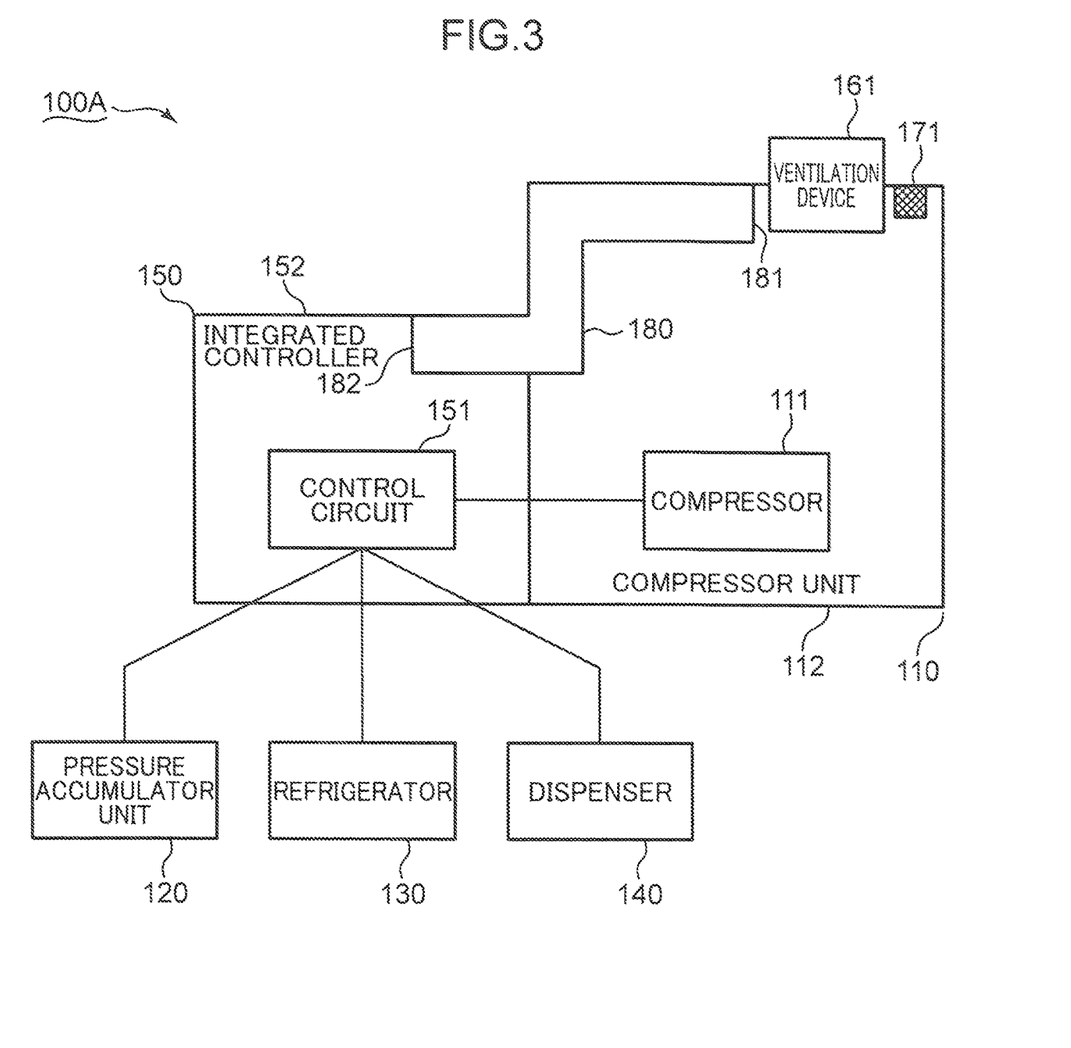
FIG. 3 is a conceptual view of a hydrogen station according to the second embodiment.

FIG. 3 is a conceptual view of a hydrogen station 100A according to the second embodiment. The hydrogen station 100A is described with reference to FIGS. 1 and 3.

Like the first embodiment, the hydrogen station 100A includes the compressor unit 110, the pressure accumulator unit 120, the refrigerator 130, the dispenser 140, the integrated controller 150, the ventilation device 161 and the sensing portion 171. With regards to the present embodiment, a ventilation fan is used as the ventilation device 161. The description in the first embodiment is applicable to these elements.

Unlike the hydrogen station 100 described in the context of the first embodiment, the hydrogen station 100A does not include the ventilation device/explosion prevention device 162 and the sensing portion 172. Instead, the hydrogen station 100A has a duct 180.

The duct 180 has a first opening end 181 which is situated inside the housing 112 of the compressor unit 110; and a second opening end 182 which is situated inside the control box 152 of the integrated controller 150. The duct 180 extends through the peripheral walls of the housing 112 and the control box 152. The duct 180 communicates the upper part of the internal space formed by the housing 112 with the upper part of the internal space formed by the control box 152.

The sensing portion 171 is situated near the first opening end 181 of the duct 180. As described above, since the duct 180 communicates the internal space formed by the control box 152 with the internal space formed by the housing 112, leaked hydrogen filling the inside of the control box 152 flows into the duct 180 from the second opening end 182, and then flows from the first opening end 181 into the internal space formed by the housing 112. Consequently, the sensing portion 171 situated near the first opening end 181 may sense that the inside of the control box 152 is filled with leaked hydrogen. Since the sensing portion 171 is situated inside the housing 112 of the compressor unit 110, the sensing portion 171 may also sense leaked hydrogen inside the housing 112, like the first embodiment. Accordingly, the sensing portion 171 is shared by the compressor unit 110 and the integrated controller 150.

Like the sensing portion 171, the ventilation device 161 is situated near the first opening end 181 of the duct 180. With regards to the present embodiment, the ventilation device 161 is a ventilation fan which takes the high ventilation measure. The ventilation fan not only sucks out the air inside the internal space formed by the housing 112 of the compressor unit 110 but also the air inside the internal space formed by the control box 152 of the integrated controller 150 through the duct 180. Accordingly, the ventilation device 161 is used for the high ventilation measure for the compressor unit 110 and the integrated controller 150.

Since the sensing portion 171 and the ventilation device 161 are shared for sensing leaked hydrogen in the compressor unit 110 and the integrated controller 150 and taking the high ventilation measure for these devices, the hydrogen station 100A is formed of a smaller number of components than the hydrogen station 100 of the first embodiment. In addition, since there is also a reduced number of wires for sensing leaked hydrogen and taking the high ventilation measure, the hydrogen station 100A may be more easily constructed at lower cost than the hydrogen station 100.

Third Embodiment

With regards to the second embodiment, the sensing portion is mounted on the compressor unit. However, a sensing portion may be additionally arranged for the integrated controller. In this case, leaked hydrogen may be detected reliably. An exemplary hydrogen station having an additional sensing portion is described in the third embodiment.

Figure 4:
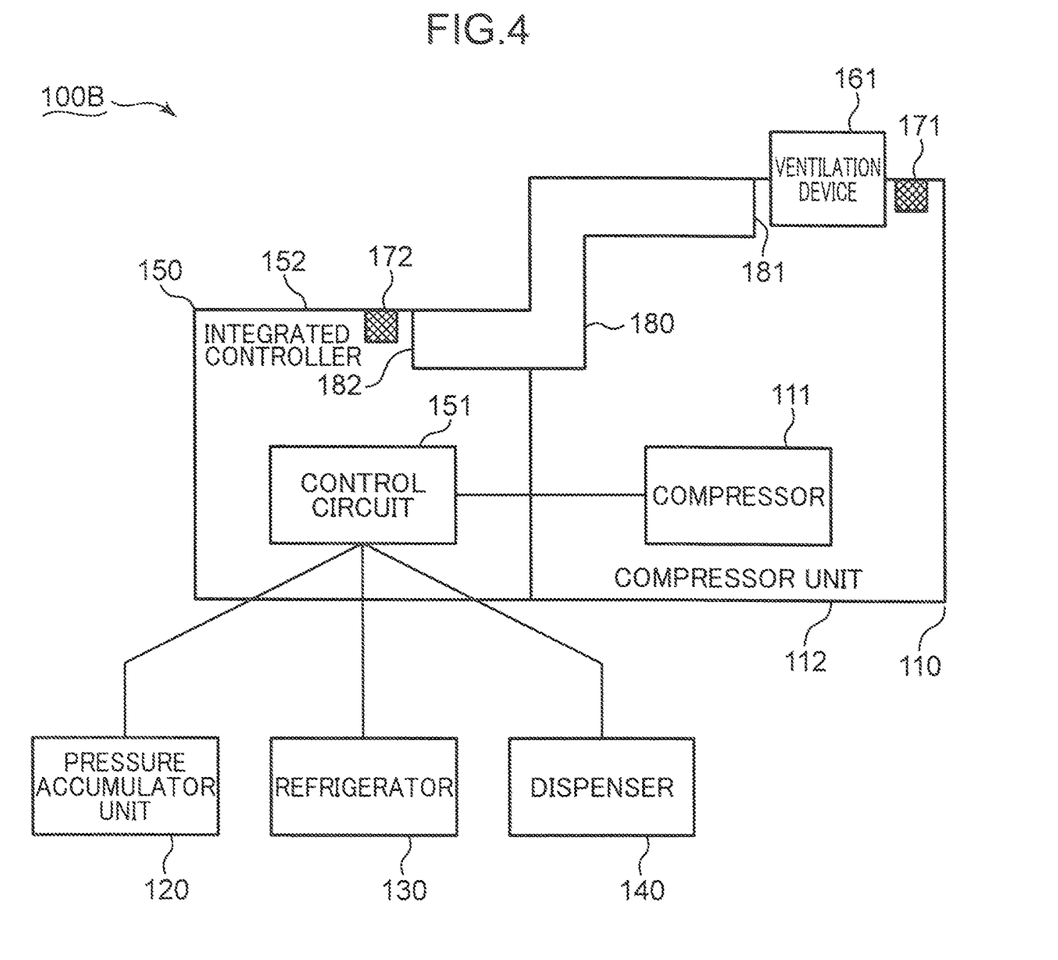
FIG. 4 is a conceptual view of a hydrogen station according to the third embodiment.

FIG. 4 is a conceptual view of a hydrogen station 100B according to the third embodiment. The hydrogen station 100B is described with reference to FIGS. 1, 3 and 4.

Like the second embodiment, the hydrogen station 100B includes the compressor unit 110, the pressure accumulator unit 120, the refrigerator 130, the dispenser 140, the integrated controller 150, the sensing portion 171 and the duct 180. Like the second embodiment, the hydrogen station 100B further includes a ventilation fan as the ventilation device 161. The description in the second embodiment is applicable to these elements.

The hydrogen station 100B further includes the sensing portion 172 described with reference to FIG. 1. The sensing portion 172 is situated near the second opening end 182 of the duct 180. Since the air inside the integrated controller 150 is sucked out by the ventilation fan, the air sucked out by the ventilation fan passes the second opening end 182 of the duct 180. Accordingly, the sensing portion 172 situated near the second opening end 182 of the duct 180 may easily sense leaked hydrogen which has leaked inside the control box 152. Since the leaked hydrogen is then also detected by the sensing portion 171, which is situated inside the housing 112 and near the ventilation fan, the occurrence of leaked hydrogen is double-checked by the sensing portions 171, 172, unlike the second embodiment. Accordingly, leaked hydrogen may be detected reliably.

Like the second embodiment, since the ventilation device 161 is shared as the high ventilation measure for the compressor unit 110 and the integrated controller 150, the hydrogen station 100B is formed by using a smaller number of wires than the hydrogen station 100 of the first embodiment. Accordingly, the hydrogen station 100B may be more easily constructed at lower cost than the hydrogen station 100.

The aforementioned embodiments mainly include hydrogen stations having the following configurations.

A hydrogen station according to one aspect of the aforementioned embodiment supplies hydrogen to a tank of a tank-equipped device. The hydrogen station includes: an integrated controller configured to integrally control devices provided in the hydrogen station; a sensing portion configured to sense leaked hydrogen which has leaked inside the integrated controller; a ventilation device configured to perform a high ventilation measure of performing ventilation for air inside the integrated controller or an explosion prevention device configured to perform an internal pressure-based explosion protection measure of creating a pressure-increased state inside the integrated controller; and a compressor unit including a compressor which is used as one of the devices; and a housing in which the compressor is stored. The integrated controller is mounted on the housing, and is electrically connected to the compressor via a through-hole formed in the housing to control the compressor.

According to the aforementioned configuration, the integrated controller integrally controls devices for holding hydrogen to be supplied to a tank of a tank-equipped device. On the other hand, there are no individual controllers for individually controlling the devices. Accordingly, the hydrogen station does not require a large installation space and may be installed at low cost.

Since the sensing portion senses leaked hydrogen which has leaked inside the integrated controller, there is a very low risk of the leaked hydrogen filling the inside of the integrated controller. In addition, since the ventilation device or the explosion prevention device performs the high ventilation measure of performing ventilation for air inside the integrated controller or the internal pressure-based explosion protection measure of creating a pressure-increased state inside the integrated controller, a safety measure is also implemented for the integrated controller.

The compressor unit is relatively large among the devices of the hydrogen station. Since the integrated controller is mounted on the housing of the compressor unit, a large area formed by the housing of the compressor unit is effectively used for mounting the integrated controller. Accordingly, the aforementioned hydrogen station may be constructed in a smaller installation space than a conventional hydrogen station in which an integrated controller is arranged at a distant position from devices.

Since the integrated controller is electrically connected to the compressor via a through-hole formed in the housing to control the compressor, the safety measure provided for the integrated controller and the compressor unit may also be used for wiring the integrated controller to the compressor. In short, a dedicated safety measure is not required for wiring the integrated controller to the compressor. Accordingly, the aforementioned hydrogen station may be constructed at lower cost than a conventional hydrogen station requiring a dedicated safety measure for wiring connecting controllers to a compressor.

With regards to the aforementioned configuration, the hydrogen station may further include a duct which communicates an internal space of the housing with an internal space of the integrated controller. The ventilation device may be mounted on the housing to discharge air inside the internal spaces of the housing and the integrated controller outside the housing.

According to the aforementioned configuration, since the duct communicates the internal space of the housing with the internal space of the integrated controller, the ventilation device mounted on the housing may discharge air inside the internal spaces of the housing and the integrated controller outside the housing. Alternatively, the ventilation device mounted on the housing may send protection gas into the internal spaces of the housing and the integrated controller. Since the common ventilation device may be used to secure the safety of the housing and the integrated controller, the hydrogen station has a small number of components. Accordingly, the aforementioned hydrogen station may be constructed at lower cost than a conventional hydrogen station.

With regards to the aforementioned configuration, the sensing portion may be mounted on the housing with the ventilation device.

According to the aforementioned configuration, since the duct communicates the internal space of the housing with the internal space of the integrated controller, the ventilation device may draw the leaked hydrogen into the housing through the duct, the leaked hydrogen having leaked inside the integrated controller. Since the sensing portion is mounted on the housing with the ventilation device, the sensing portion may sense at least one of leaked hydrogen, which has leaked inside the housing, and leaked hydrogen, which has been drawn into the housing from the integrated controller. Since the common sensing portion may be used for the detection of the leaked hydrogen inside the housing and the integrated controller, the facility for sensing leaked hydrogen may be constructed by using a small number of components. Therefore, the aforementioned hydrogen station may be constructed at lower cost than a conventional hydrogen station. In addition, since the sensing portion and the ventilation device are mounted on the housing, a large space is not required for their wiring.

With regards to the aforementioned configuration, the devices may include a refrigerator which cools brine for cooling the hydrogen; a dispenser which supplies the hydrogen to the tank; and a pressure accumulator unit in which the hydrogen compressed by the compressor is stored. The integrated controller may be electrically connected to and control each of the refrigerator, the dispenser and the pressure accumulator unit.

According to the aforementioned configuration, since the integrated controller integrally controls not only the compressor unit but also the refrigerator which cools brine for cooling hydrogen, the dispenser which supplies hydrogen to a tank of a tank-equipped device, and the pressure accumulator unit in which hydrogen compressed by the compressor is stored, individual controllers are not required for individually controlling the devices. Accordingly, the hydrogen station does not require a large installation space.

With regards to the aforementioned configuration, the integrated controller may be bus-connected to the compressor, the refrigerator, the dispenser and the pressure accumulator unit to form a field network.

According to the aforementioned configuration, since the integrated controller is bus-connected to the compressor, the refrigerator, the dispenser and the pressure accumulator unit to form a field network, the devices forming the hydrogen station may be electrically connected by using a small number of wires. Since the field network allows easy connection of additional facilities, functions of the hydrogen station may be easily expanded.

With regards to the aforementioned configuration, the integrated controller may include a transmitter configured to transmit state data as a radio signal, the state data indicating a state of the hydrogen station.

According to the aforementioned configuration, the transmitter of the integrated controller transmits state data as a radio signal, the state data indicating a state of the hydrogen station. Therefore, an operator carrying a reception device for receiving the radio signal may monitor the state of the hydrogen station at a distant location from the hydrogen station.

The embodiments described herein are exemplary in every aspect, and should be construed as not being limiting. The scope of the present invention is indicated by the claims rather than the description provided above, and is intended to include all modifications within the meaning and range of equivalents of the claims.

INDUSTRIAL APPLICABILITY

The aforementioned techniques are suitably applicable to hydrogen stations for supplying hydrogen to tanks of tank-equipped devices.

This application is based on Japanese Patent Application No. 2017-146754 filed in Japan Patent Office on Jul. 28, 2017, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A hydrogen station for supplying hydrogen to a tank of a tank-equipped device, the hydrogen station comprising:
   an integrated controller which includes a control circuit and a box in which the control circuit is placed, the control circuit being configured to integrally control devices provided in the hydrogen station, the devices including a compressor;
   a sensing portion configured to sense leaked hydrogen which has leaked inside the integrated controller;
   a compressor unit including the compressor and a housing in which the compressor is placed, the housing including a side wall in which a through-hole is formed;
   an electrical connection line configured to extend through the through-hole to connect the integrated controller to the compressor;
   a duct including a first opening end which is situated inside the housing of the compressor unit and a second opening end which is situated inside the box of the integrated controller so that the duct communicates an internal space of the housing and an internal space of the box; and
   a ventilator mounted on the housing of the compressor unit to discharge air inside the internal space of the housing and the internal space of the box,
   wherein the box is placed outside the housing and mounted on the side wall, the box including a side wall which is attached to the housing of the compressor unit, and
   wherein the duct extends from the first opening end to the second opening end through an upper portion of the side wall of the box of the integrated controller adjacent to the compressor unit.

2. The hydrogen station according to claim 1,
   wherein the ventilator includes the duct and a ventilation fan, the fan communicating the internal space of the housing with an internal space of the integrated controller,
   the fan being mounted on the housing to discharge air inside the internal spaces of the housing and the integrated controller outside the housing.

3. The hydrogen station according to claim 2, wherein the sensing portion is mounted on the housing with the ventilator.

4. The hydrogen station according to claim 1,
   wherein the devices include a refrigerator which cools brine for cooling the hydrogen; a dispenser which supplies the hydrogen to the tank; and a pressure accumulator unit in which the hydrogen compressed by the compressor is stored, and
   wherein the integrated controller is electrically connected to and controls each of the refrigerator, the dispenser and the pressure accumulator unit.

5. The hydrogen station according to claim 4, wherein the integrated controller is bus-connected to the compressor, the refrigerator, the dispenser and the pressure accumulator unit to form a field network.

6. The hydrogen station according to claim 1, wherein the integrated controller includes a transmitter configured to transmit state data as a radio signal, the state data indicating a state of the hydrogen station.

* * * * *